United States Patent
Lee et al.

(10) Patent No.: US 9,377,873 B2
(45) Date of Patent: Jun. 28, 2016

(54) FLEXIBLE GLASS DISPLAY APPARATUS AND METHOD FOR CONTROLLING THE SAME

(71) Applicant: LG ELECTRONICS INC., Seoul (KR)

(72) Inventors: Doyoung Lee, Seoul (KR); Yongsin Kim, Seoul (KR); Jihwan Kim, Seoul (KR); Sinae Chun, Seoul (KR); Jongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/474,784

(22) Filed: Sep. 2, 2014

(65) Prior Publication Data
US 2015/0286288 A1    Oct. 8, 2015

(30) Foreign Application Priority Data
Apr. 7, 2014    (KR) .......................... 10-2014-0041323

(51) Int. Cl.
| | |
|---|---|
| G06F 3/041 | (2006.01) |
| G06F 3/01 | (2006.01) |
| G06F 3/03 | (2006.01) |
| G06F 1/16 | (2006.01) |
| G06F 3/147 | (2006.01) |
| G09G 5/02 | (2006.01) |

(52) U.S. Cl.
CPC ................ *G06F 3/03* (2013.01); *G06F 1/1652* (2013.01); *G06F 3/016* (2013.01); *G06F 3/0412* (2013.01); *G06F 3/147* (2013.01); *G09G 5/02* (2013.01); *G09G 2320/0686* (2013.01); *G09G 2340/0464* (2013.01); *G09G 2340/10* (2013.01); *G09G 2340/14* (2013.01); *G09G 2354/00* (2013.01); *G09G 2380/02* (2013.01)

(58) Field of Classification Search
CPC ............................... G06F 1/1652; G06F 3/016
See application file for complete search history.

(56) References Cited

U.S. PATENT DOCUMENTS

| | | | | |
|---|---|---|---|---|
| 2004/0055345 | A1* | 3/2004 | Moore | B60R 25/23 70/257 |
| 2009/0298546 | A1* | 12/2009 | Kim | G06F 1/1616 455/566 |
| 2010/0053071 | A1 | 3/2010 | Cohen et al. | |
| 2013/0222207 | A1* | 8/2013 | Baek | G06F 5/00 345/1.1 |
| 2013/0229324 | A1* | 9/2013 | Zhang | G09G 5/00 345/1.3 |
| 2014/0028597 | A1 | 1/2014 | Cho et al. | |
| 2014/0035942 | A1 | 2/2014 | Yun et al. | |
| 2014/0078046 | A1 | 3/2014 | Seo et al. | |
| 2014/0137041 | A1* | 5/2014 | Jeon | G06F 3/0482 715/815 |

FOREIGN PATENT DOCUMENTS

EP    2166443    A2    3/2010

* cited by examiner

*Primary Examiner* — Lixi C Simpson
(74) *Attorney, Agent, or Firm* — Birch, Stewart, Kolasch & Birch, LLP

(57) ABSTRACT

A flexible glass display apparatus and a method for displaying image data in the apparatus are provided. The flexible glass display apparatus includes: a flexible glass display unit that displays image data portions; a sensing unit that detects bending of the display unit; another sensing unit that detects first and second areas which are brought into contact with each other due to bending of the display unit; and a controller, upon detection of contact between the first and second areas, controls at least one image data portion displayed in the first and second areas based on the contact, wherein an image data portion displayed in any one of the first and second areas is distinguishable in the other area.

14 Claims, 11 Drawing Sheets

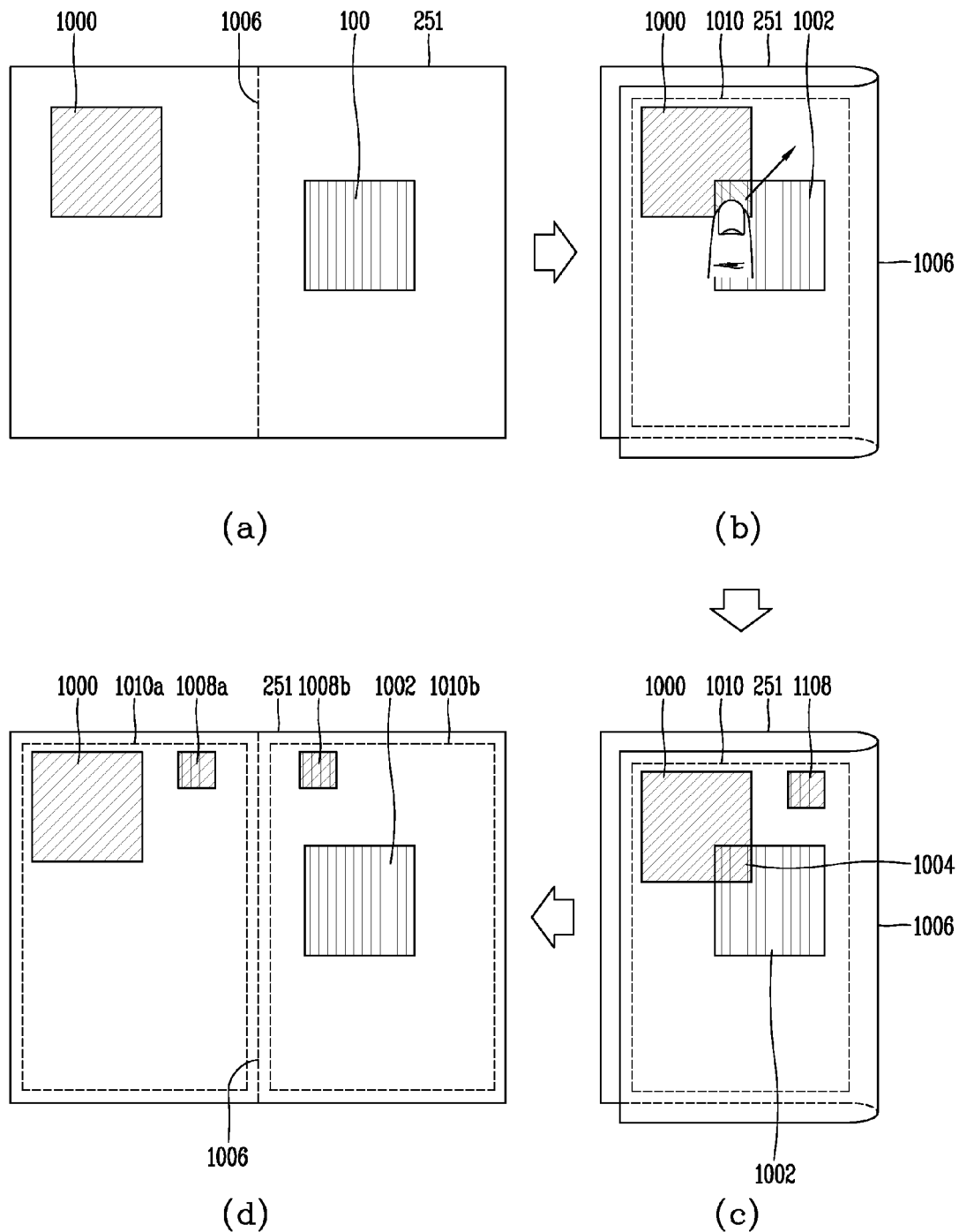

FIG. 11A
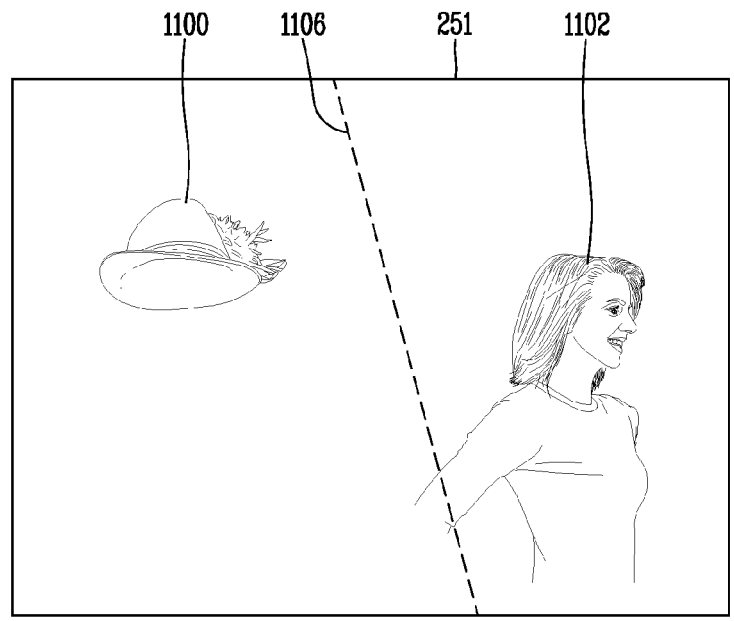
(a)
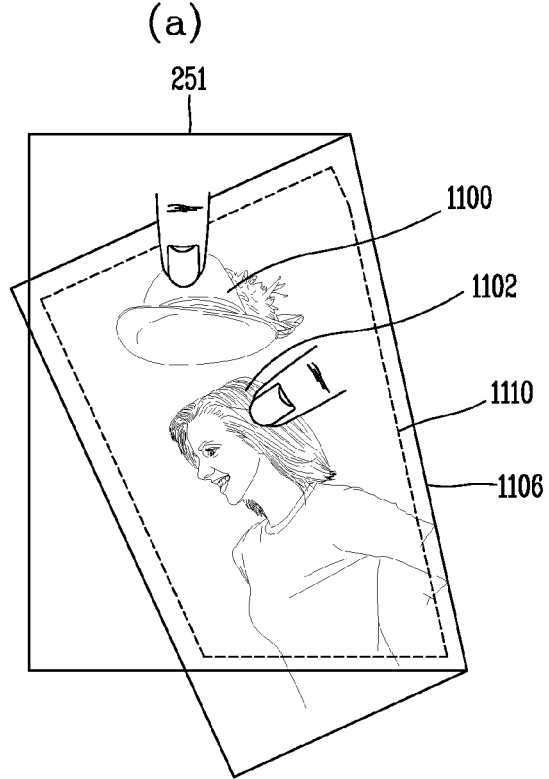
(b)

FIG. 11B
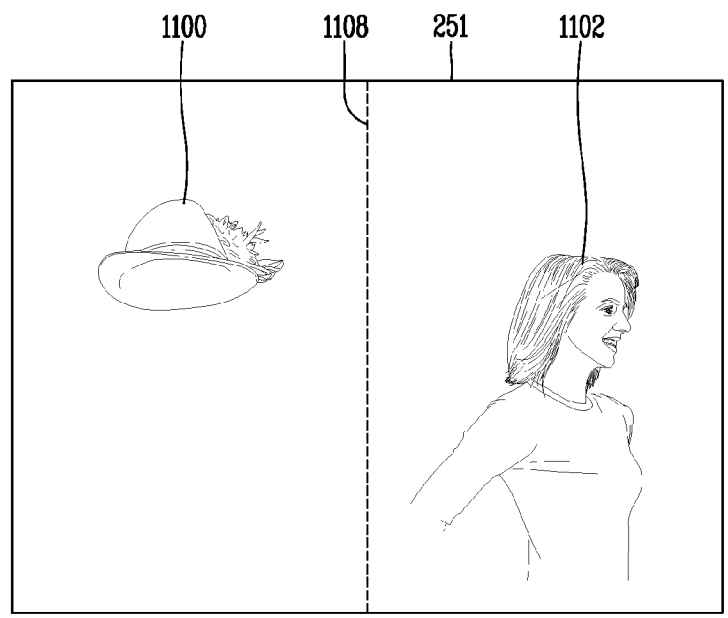
(a)
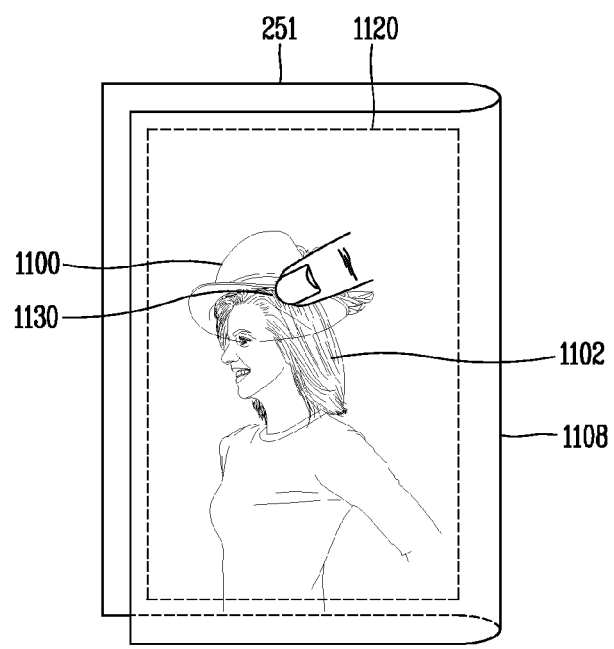
(b)

FLEXIBLE GLASS DISPLAY APPARATUS AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2014-0041323, filed on Apr. 7, 2014, the contents of which is incorporated by reference herein in its entirety.

BACKGROUND OF THE INVENTION

1. Field of the Invention

The present invention relates to a flexible glass display apparatus and a method for displaying image data on the apparatus.

2. Description of the Conventional Art

A flexible display is a display which is twistable, bendable, squeezable, foldable, and rollable in nature by external force. For example, the flexible display may be a display which is manufactured on a thin, flexible substrate that is twistable, bendable, foldable, or rollable like paper while keeping the display characteristics of a conventional flat panel display.

When the flexible display is not bent (e.g., has a infinite radius of curvature; hereinafter, referred to as the first state), the display region of the flexible display is flat. When the flexible display is bent (e.g., has a finite radius of curvature; hereinafter, referred to as the second state), the display region may be flat. Information displayed in the second state may be visual information that is output on a curved surface.

Such a flexible display may be implemented in the form of a transparent display that permits light to be transmitted through at least some area. Similarly to a typical transparent display, the flexible glass display allows images of objects located at the rear to be reflected in a way that can be seen from the front. Besides, the flexible glass display has the benefits of a typical flexible display-like being bendable, squeezable, foldable, or rollable.

Accordingly, a flexible glass display apparatus may display image data in a completely different manner from that of a conventional glass display apparatus or conventional flexible display apparatus, or provide an entirely new user environment (UI (user interface) or UX (user experience)). As such, research on new methods of displaying image data or new user environments is currently actively underway.

SUMMARY OF THE INVENTION

Therefore, the present invention has been made in an effort to solve the above and other problems occurring in the prior art.

An aspect of the present invention is to provide a flexible glass display apparatus which, upon application of touch input from the user, allows at least one image data portion displayed on a display unit to be controlled depending on a deformed state of the flexible glass display apparatus, and a method for controlling the same.

Another aspect of the present invention is to provide a flexible glass display which allows an image data portion displayed in one area of a display unit and an image data portion displayed in another area of the display unit to be controlled as the user chooses, if the image data portion displayed in the one area is reflected in the another area due to bending, twisting, or squeezing of the flexible glass display, and a method for controlling the same.

Yet another aspect of the present invention is to provide a flexible glass display which, upon detecting touch input from the user on any one image data portion displayed on a display unit, outputs tactile information set on the image data portion and tactile information set on another image data portion in a different area, which is reflected in the area where the any one image data portion is displayed, as a response to the touch input.

To achieve these and other advantages and in accordance with the purpose of this specification, as embodied and broadly described herein, there is provided a flexible glass display apparatus including: a flexible glass display unit that displays image data portions; a sensing unit that detects bending of the display unit; another sensing unit that detects first and second areas which are brought into contact with each other due to bending of the display unit; and a controller, upon detection of contact between the first and second areas, controls at least one image data portion displayed in the first and second areas based on the contact, wherein an image data portion displayed in any one of the first and second areas may be distinguishable in the other area.

The controller may change the color of at least part of image data portions displayed in the first and second areas.

At least part of an image data portion in the other area may be distinguishable through at least part of the image data portions of the changed color, and the controller may change the color of at least part of an image data portion in one area through which an image data portion in the other area is distinguishable to a mixture of the color of the image data portion displayed in the first area and the color of the image data portion displayed in the second area.

The sensing unit may further detect user's touch input on the first and second areas, and the controller may control the image data portions displayed in the second area based on the touch input detected in the first area.

The controller may change the position of at least part of the image data portions displayed in the first and second areas based on the user's touch input.

The controller may change the color of part of a first image data portion, which corresponds to the touch input and is displayed in the first area and through which at least part of a second image data portion displayed in the second area is distinguishable, to a mixture of the color of the first image data portion and the color of the second image data portion.

Upon detecting the user's touch input on at least part of the changed color of the image data portion in any one of the first and second areas, the controller may change the position of the part of the changed color of at least one of the first and second image data portions based on the touch input.

The controller may create a new image data portion of the size and color corresponding to the part of the changed color and change the position of the created image data portion in at least one of the first and second areas based on the touch input.

The controller may allow the positions and sizes of image data portions displayed in the second area to be recognized in both of the first and second areas to control at least one of the image data portions displayed in the second area based on the touch input on the first area.

The controller may detect the user's touch input in different touch detection modes for the first and second areas and control the image data portion in the second area based on the touch input detected according to the touch detection mode set on the second area.

The flexible glass display apparatus may further include a tactile module for outputting preset tactile information, and upon detecting touch input on any one of the image data portions displayed in the first and second areas, the controller may control the tactile module to output the tactile information set on the image data portion on which the touch input is detected.

Upon detecting, in the first area, the touch input on any one of the image data portions in the second area which is distinguishable in the first area, the controller may control the tactile module to output tactile information preset on the image data portion in the second area.

The controller may allow the positions and sizes of image data portions displayed in the second area to be recognized in both of the first and second areas, and determine whether the touch input is intended for any one of the image data portions displayed in the second area, based on the recognition result.

The controller may use different touch detection modes for the first and second areas to detect the touch input and determine whether the touch input is intended for any one of the image data portions displayed in the second area, based on the touch detection mode set on the second area.

Upon detecting that user's touch input on an image data portion in the first area, through which at least part of an image data portion in the second area is distinguishable, is intended for the distinguishable part of the image data portion in the second area, the controller may control the tactile module to combine tactile information corresponding to the image data portion in the first area with tactile information corresponding to the image data portion in the second area and output the combined tactile information.

Another embodiment of the present invention provides a method for controlling a flexible glass display apparatus, the method including the steps of: detecting bending of the display unit; detecting first and second areas which are brought into contact with each other due to bending of the display unit; and controlling at least one image data portion displayed in the first and second areas based on the contact, wherein an image data portion displayed in any one of the first and second areas may be distinguishable in the other area.

The step of controlling image data portions may further include the steps of: combining together at least two image data portions displayed in the first and second areas; and changing the color of at least part of the combined image data portions to a mixture of the colors of the combined image data portions.

The combined image data portions include an image data portion in each of the first and second areas, through which at least part of an image data portion displayed in the other area is distinguishable, and the image data portion displayed in the other area, at least part of which is distinguishable.

The step of detecting first and second areas may further include the step of detecting user's touch input in the first area, and the step of controlling at least one image data portion may include the step of controlling an image data portion displayed in the second area based on the touch input detected in the first area.

The step of detecting touch input may further include: the step of detecting at least one image data portion displayed in the first and second areas and corresponding to the user's touch input; and outputting tactile information set on the detected at least one image data portion as a response to the touch input.

The step of outputting tactile information may be the step of, upon detecting multiple image data portions, outputting a combination of tactile information set on the multiple image data portions.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 10 is a view illustrating an example of controlling, based on user's touch input, at least part of image data portions selected depending on a deformed state of the flexible glass display apparatus related to the present invention; and FIGS. 11a and 11b are conceptual diagrams for explaining an example of outputting different tactile information depending on a deformed state of the flexible glass display device related to the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a transparent flexible display apparatus (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1:
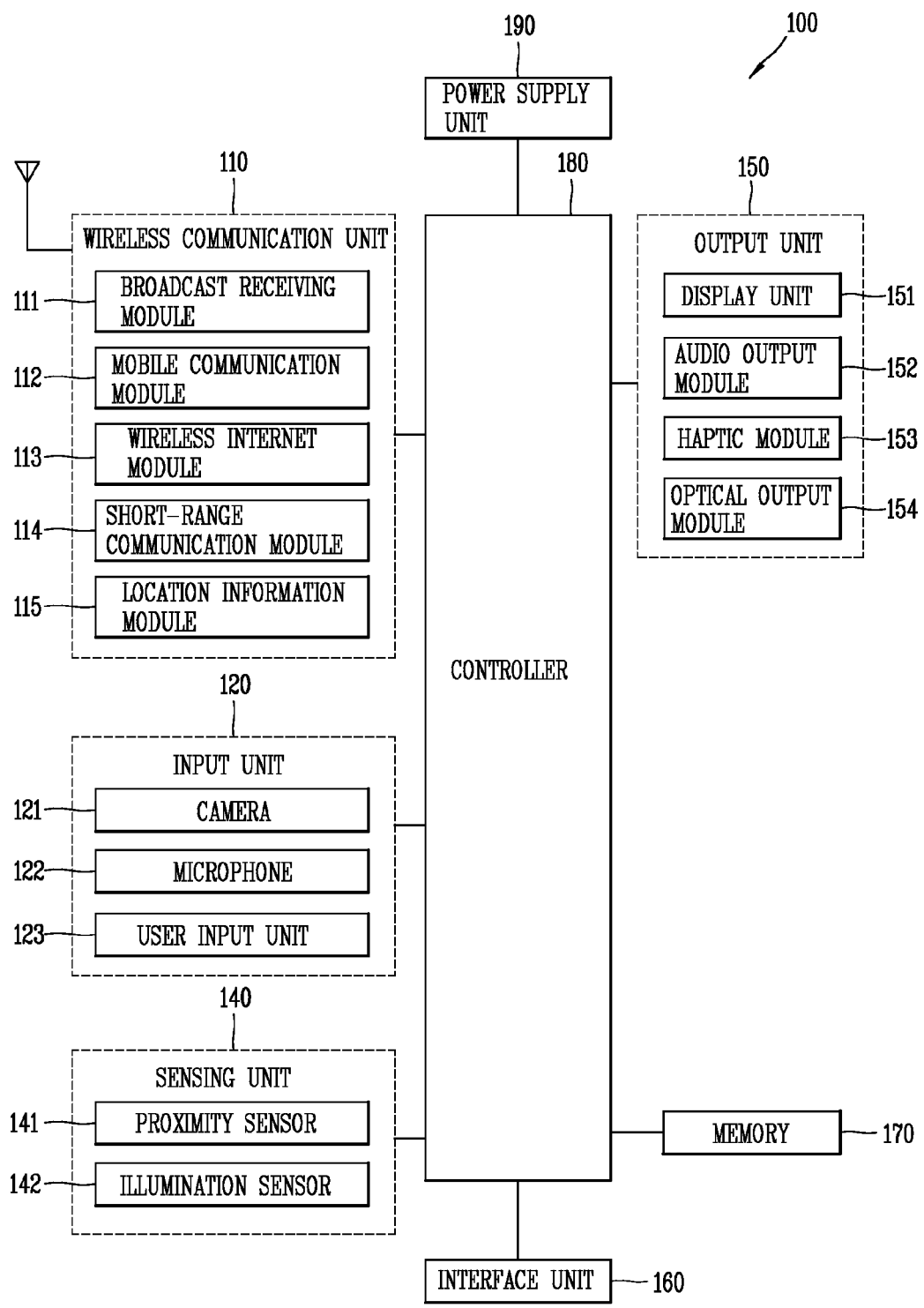
FIG. 1 is a block diagram for explaining a flexible glass display apparatus related to the present invention.
Figure 2:
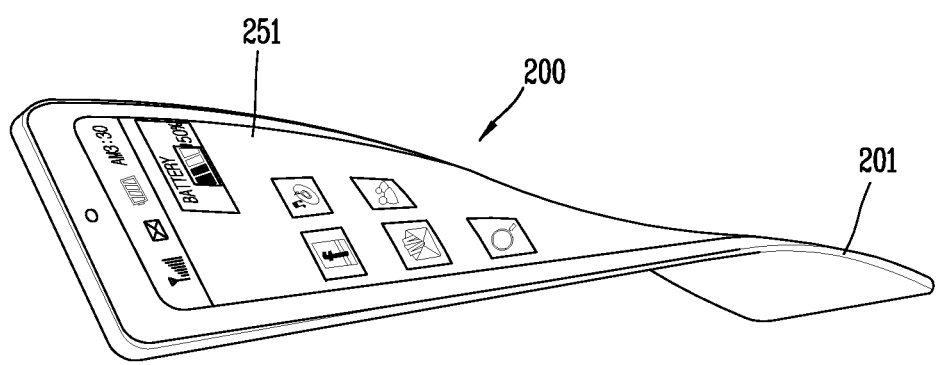
FIG. 2 is a conceptual diagram illustrating an example in which the flexible glass display apparatus related to the present invention is deformed by external force.

FIG. 1 is a block diagram for describing a transparent flexible display apparatus according to an embodiment of the present invention.

The transparent flexible display apparatus 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the transparent flexible display apparatus 100 is shown having wireless communication unit 110 configured with several commonly implemented components. For instance, the wireless communication unit 110 typically includes one or more components which permit wireless communication between the transparent flexible display apparatus 100 and a wireless communication system or network within which the transparent flexible display apparatus is located.

The wireless communication unit 110 typically includes one or more modules which permit communications such as wireless communications between the transparent flexible display apparatus 100 and a wireless communication system, communications between the transparent flexible display apparatus 100 and another transparent flexible display apparatus, communications between the transparent flexible display apparatus 100 and an external server. Further, the wireless communication unit 110 typically includes one or more modules which connect the transparent flexible display apparatus 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the transparent flexible display apparatus, the surrounding environment of the transparent flexible display apparatus, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The transparent flexible display apparatus 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the transparent flexible display apparatus 100 and a user, as well as function as the user input unit 123 which provides an input interface between the transparent flexible display apparatus 100 and the user.

The interface unit 160 serves as an interface with various types of external devices that can be coupled to the transparent flexible display apparatus 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the transparent flexible display apparatus 100 may perform assorted control functions associated with a connected external device, in response to the external device being connected to the interface unit 160.

The memory 170 is typically implemented to store data to support various functions or features of the transparent flexible display apparatus 100. For instance, the memory 170 may be configured to store application programs executed in the transparent flexible display apparatus 100, data or instructions for operations of the transparent flexible display apparatus 100, and the like. Some of these application programs may be downloaded from an external server via wireless communication. Other application programs may be installed within the transparent flexible display apparatus 100 at time of manufacturing or shipping, which is typically the case for basic functions of the transparent flexible display apparatus 100 (for example, receiving a call, placing a call, receiving a message, sending a message, and the like). It is common for application programs to be stored in the memory 170, installed in the transparent flexible display apparatus 100, and executed by the controller 180 to perform an operation (or function) for the transparent flexible display apparatus 100.

The controller 180 typically functions to control overall operation of the transparent flexible display apparatus 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the transparent flexible display apparatus 100. The power supply unit 190 may include a battery, and the battery may be configured to be embedded in the terminal body, or configured to be detachable from the terminal body.

At least some of the above components may operate in a cooperating manner, so as to implement an operation or a control method of a transparent flexible display apparatus according to various embodiments to be explained later. The operation or the control method of the transparent flexible display apparatus may be implemented on the transparent flexible display apparatus by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external transparent flexible display apparatus, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the transparent flexible display apparatus 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the transparent flexible display apparatus 100 and a wireless communication system, communications between the transparent flexible display apparatus 100 and another transparent flexible display apparatus 100, or communications between the transparent flexible display apparatus and a network where another transparent flexible display apparatus 100 (or an external server) is located, via wireless area networks. One example of the wireless area networks is a wireless personal area networks.

In some embodiments, another transparent flexible display apparatus (which may be configured similarly to transparent flexible display apparatus 100) may be a transparent flexible display apparatus, for example, a smart watch, a smart glass or a head mounted display (HMD), which is able to exchange data with the transparent flexible display apparatus 100 (or otherwise cooperate with the transparent flexible display apparatus 100). The short-range communication module 114 may sense or recognize the transparent flexible display apparatus, and permit communication between the transparent flexible display apparatus and the transparent flexible display apparatus 100. In addition, when the sensed transparent flexible display apparatus is a device which is authenticated to communicate with the transparent flexible display apparatus 100, the controller 180, for example, may cause transmission of data processed in the transparent flexible display apparatus 100 to the transparent flexible display apparatus via the short-range communication module 114. Hence, a user of the transparent flexible display apparatus may use the data processed in the transparent flexible display apparatus 100 on the transparent flexible display apparatus . For example, when a call is received in the transparent flexible display apparatus 100, the user may answer the call using the transparent flexible display apparatus. Also, when a message is received in the transparent flexible display apparatus 100, the user can check the received message using the transparent flexible display apparatus.

The location information module 115 is generally configured to detect, calculate, derive or otherwise identify a position of the transparent flexible display apparatus. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the transparent flexible display apparatus.

As one example, when the transparent flexible display apparatus uses a GPS module, a position of the transparent flexible display apparatus may be acquired using a signal sent from a GPS satellite. As another example, when the transparent flexible display apparatus uses the Wi-Fi module, a position of the transparent flexible display apparatus can be acquired based on information related to a wireless access point (AP) which transmits or receives a wireless signal to or from the Wi-Fi module.

The input unit 120 may be configured to permit various types of input to the transparent flexible display apparatus 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the transparent flexible display apparatus 100. As another example, the cameras 121 may be located in a stereoscopic arrangement to acquire left and right images for implementing a stereoscopic image.

The microphone 122 is generally implemented to permit audio input to the transparent flexible display apparatus 100. The audio input can be processed in various manners according to a function being executed in the transparent flexible display apparatus 100. If desired, the microphone 122 may include assorted noise removing algorithms to remove unwanted noise generated in the course of receiving the external audio.

The user input unit 123 is a component that permits input by a user. Such user input may enable the controller 180 to control operation of the transparent flexible display apparatus 100. The user input unit 123 may include one or more of a mechanical input element (for example, a key, a button located on a front and/or rear surface or a side surface of the transparent flexible display apparatus 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the transparent flexible display apparatus at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the transparent flexible display apparatus, surrounding environment information of the transparent flexible display apparatus, user information, or the like. The controller 180 generally cooperates with the sending unit 140 to control operation of the transparent flexible display apparatus 100 or execute data processing, a function or an operation associated with an application program installed in the transparent flexible display apparatus based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the transparent flexible display apparatus covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the transparent flexible display apparatus 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the transparent flexible display apparatus 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the transparent flexible display apparatus 100. For example, the display unit 151 may display execution screen information of an application program executing at the transparent flexible display apparatus 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may convert and output as sound audio data received from the wireless communication unit 110 or stored in the memory 170 in a call signal reception mode, a call mode, a record mode, a voice recognition mode, a broadcast reception mode, and the like. Also, the audio output module 152 may provide audible outputs related to a particular function performed by the transparent flexible display apparatus 100 (e.g., a call signal reception sound, a message reception sound, etc.). The audio output module 152 may include a speaker, a buzzer or the like.

A haptic module 153 generates various tactile effects the user may feel. A typical example of the tactile effects generated by the haptic module 153 is vibration. The strength and pattern of the haptic module 153 can be controlled. For example, different vibrations may be combined to be outputted or sequentially outputted.

Besides vibration, the haptic module 153 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 153 may be implemented to allow the user to feel a tactile effect through a muscle sensation such as fingers or arm of the user, as well as transferring the tactile effect through a direct contact. Two or more haptic modules 155 may be provided according to the configuration of the transparent flexible display apparatus 100.

A flexible glass display apparatus 100 related to the present invention may include a tactile module 155 in addition to the haptic module 153. The tactile module 155 may output tactile information set on a specific area of a display unit 151 where the user's body parts, for example, fingertips, are sensed. For example, the tactile module 155 may generate electrostatic attraction force to artificially adjust frictional force acting on an area touched by the user's fingertips, and the user therefore has a particular texture or tactile feel.

Moreover, even when the user touches the back face of the display unit 151, the tactile module 155 may output the tactile information on the back face of the flexible display unit 151 where the touch input is detected, so that the user can have a preset tactile feel.

A mobile terminal 200 according to a modification of the present invention may include a deformation detection means for detecting deformation of a flexible display unit 251. The deformation detection means may be included in a sensing unit 140 (see FIG. 1).

The deformation detection means may be provided in a flexible display unit 251 or a case 201 to detect information about deformation of the flexible display unit 251. The deformation-related information may include the direction of deformation of the flexible display unit 251, the amount of deformation, the position of deformation, the time of deformation, and the rate of acceleration at which the flexible display unit 251 recovers from deformation, and other various information that can be detected due to bending of the flexible display unit 251.

In addition, the controller 180 may change information displayed on the flexible display unit 251 or generate a control signal for controlling the functions of the flexible glass display apparatus 100, based on the information related to deformation of the flexible display unit 251 detected by the deformation detection means.

If contacting areas are formed due to deformation, i.e., bending, twisting, or squeezing of the flexible display unit 251, caused by external force, the controller 180 may control at least one image data portion displayed in the contacting areas.

When the flexible display unit 251 is bent by external force, the controller 180 may detect the contacting areas. Herein, the contacting areas are denoted by first and second areas. If the first and second areas are in contact with each other on the flexible display unit 251, the controller 180 may detect the size and position of the first area contacting the second area. Also, the controller 180 may control the image data portions displayed in the first and second areas.

For example, the controller 180 may change the color of at least part of the image data portions displayed in the first and second areas contacting each other. Color changes may be made to image data portions in the first and second areas which appear overlapping each other. That is, the flexible display unit 251 of the present invention is implemented in the form of a glass display, as described above, and an image data portion displayed in the second area contacting the first area may be therefore visible in the first area. In this case, at least part of the image data portion displayed in the second area may be distinguishable through at least part of an image data portion displayed in the first area.

In this way, upon detecting contact between the first and second areas, the controller 180 may change the color of an overlap region between an image data portion in the first area and an image data portion in the second area. The controller 180 may change the colors of overlapping parts of the first and second areas to a mixture of the colors of the image data portions in the first and second areas.

Needless to say, upon detecting contact only, the controller 180 may control image data portions as the user chooses, without controlling the image data portions displayed in the contacting areas.

For example, upon detecting the user's touch input in any one of the areas contacting areas, the controller 180 may control the image data portion displayed in the touch detection area and the image data portion in the other area, based on the touch input.

By the way, the flexible display unit 251 according to an embodiment of the present invention may be implemented as a glass display. Accordingly, if some areas are in contact with each other due to deformation caused by external force, an image data portion displayed in each of the contacting areas may be reflected and visible in the other contacting area. Accordingly, the image data portion displayed in each of the contacting areas may be distinguishable in the other contacting area. Also, the user may touch the image data portion in one of the contacting areas which can be distinguished in the other contacting area. Based on the user's touch input, the controller 180 may change the position or color of at least part of the image data portions displayed in the area other than the touch detection area.

The controller 180 may control the image data portions displayed in both of the contacting areas, based on the user's touch input. For example, if the contacting areas are formed, the controller 180 may combine at least two image data portions displayed in the contacting areas, and, if there is touch input from the user on any one of the two combined image data portions, change the positions of the two combined image data portions in the respective areas. The combined image data portions may include an image data portion displayed in one (first area) of the contacting areas and an image data portion displayed in the other contacting area (second area) and reflected and visible in the area on the display unit where the image data portion in the first area is displayed.

That is, in the present invention, at least two image data portions in areas contacting each other which appear at least partially overlapping each other through a glass display may be combined together, and the colors or positions of the combined image data portions in the respective areas may be changed based on the user's touch input on any one of the combined image data portions. In addition, it is needless to say that the controller 180 can change the colors or positions of only part of the combined image data portions as the user chooses.

A flexible glass display apparatus 100 related to an embodiment of the present invention may include a tactile module 155 to output tactile information set on an image data portion in a user touch detection area. If contacting areas are formed due to deformation of the flexible display unit 251 caused by external force, the controller 180 may output tactile information set on the image data portion in the user touch detection area and tactile information set on the image data portion displayed in the other area contacting the user touch detection area, as a response to the touch input.

For example, if contacting areas are formed due to bending, twisting, or squeezing of the flexible glass display 251, an image data portion displayed in each of the contacting areas may be reflected and visible in the other area. Also, upon detecting the user's touch input in one of the areas where the image data portion displayed in the other area is reflected and visible, the controller may output tactile information set on the image data portion displayed in the other area as a response to the touch input.

Figure 3A:
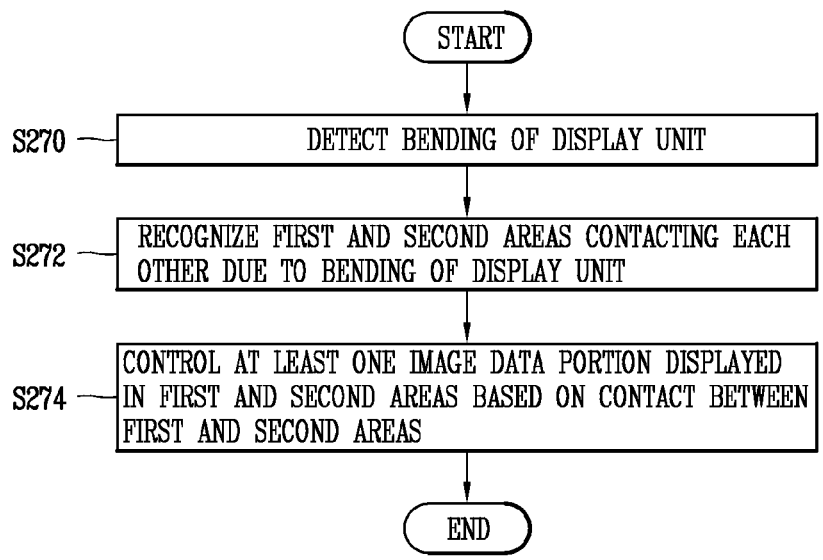
FIGS. 3a and 3b illustrate the operational procedure of a flexible glass display apparatus related to the present invention.
Figure 3B:
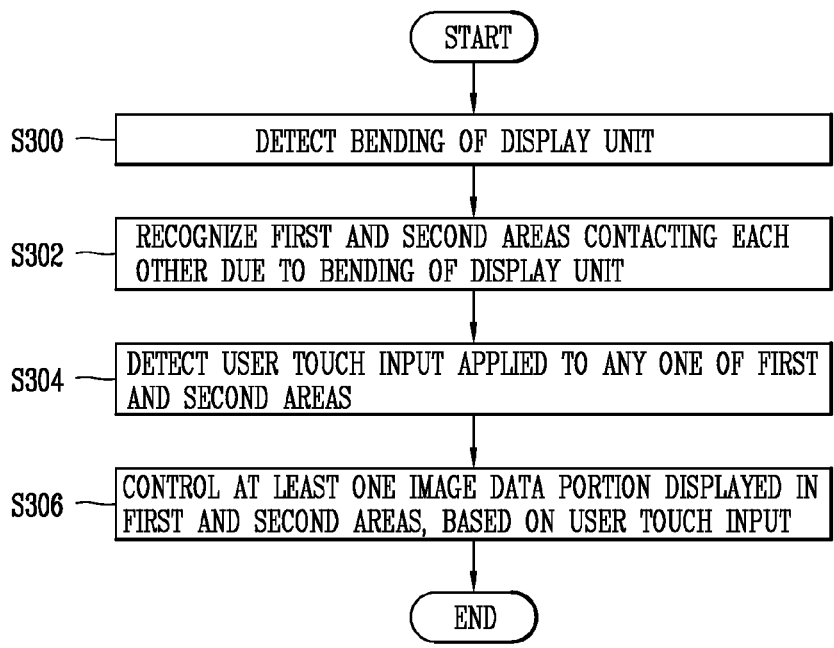

FIGS. 3a and 3b illustrate the operational procedure of a flexible glass display apparatus related to the present invention.

Referring first to FIG. 3a, the controller 180 of the flexible glass display apparatus 100 according to the embodiment of the present invention detects a deformation of the flexible display unit 251 caused by external force (S207). While the flexible display unit 251 may be deformed in various ways such as being bent, squeezed, twisted, etc, the following description will be given on an example where the flexible display unit 251 is bent. Needless to say, the present invention is not limited to this example.

In the step S270, the controller 180 detects bending of the flexible display unit 251. If the flexible display unit 251 is bent at more than a predetermined angle and hence some areas of the flexible display unit 251 come into contact with each other, the controller 180 detects this and recognizes these contacting areas (S272).

For example, when the flexible display unit 251 is bent with respect to a certain straight line by external force, the controller 180 may detect this through the sensing unit 140. If the angle of bend of the flexible display unit 251 is more than a predetermined angle, the controller 180 may estimate the areas contacting each other on the flexible display unit 251 based on the bending (or folding) of the flexible display unit 251 with respect to the straight line. The estimated areas may be recognized as the first and second areas in the step S272.

Alternatively, the controller 180 may recognize areas on the flexible display unit 251 that are actually brought into physical contact with each other due to bending are the first and second areas. For example, the controller 180 may detect areas approaching each other within a predetermined distance on the display unit 251 and recognize the detected areas as the first and second areas. Alternatively, if a detection result of the touch sensor reveals that one area of the flexible display unit 251 and another area of the flexible display unit 251 are in direct contact with each other, the controller 180 may recognize the contacting areas as the first and second areas.

If some areas are brought into contact with each other and therefore recognized as the first and second areas in the step S272, the controller 180 may control at least one image data portion displayed in the first and second areas. For example, the controller 180 automatically change the color of at least part of the image data portions displayed in the first and second areas.

That is, if some areas are brought into contact with each other, the controller 180 may change the color of at least part of the image data portions displayed in the first area to the color of a specific image data portion displayed in the second area. On the contrary, the color of at least part of the image data portions displayed in the second area may be changed based on the color of a specific image data portion displayed in the first area.

Alternatively, the controller 180 may change the colors of at least part of the image data portions in the first and second areas which appear overlapping each other. That is, if at least part of a first image data portion displayed in the first area and at least part of a second image data portion displayed in the second area appear overlapping each other in the contacting areas, the controller 180 may change the colors of the overlapping parts of the first image data portion and second image data portion. In this case, the controller 180 may change the colors of at least part of the first and second image data portions appearing overlapping each other to a mixture of the colors of the first image data portion and second image data portion.

FIG. 3a has been described on the assumption that, if some areas are brought into contact with each other due to bending of the flexible display unit 251, the controller 180 immediately controls image data portions displayed in the first and second areas. It is needless to say that the flexible glass display apparatus according to the embodiment of the present invention allows for controlling of at least one image data portion selected by the user as the user chooses.

FIG. 3b illustrates an example of this case. Referring to FIG. 3b, the controller 180 of the flexible glass display apparatus 100 according to the embodiment of the present invention detects bending of the flexible display unit 251 caused by external force (S300). If contacting areas are formed due to the bending, the contacting areas are recognized as first and second areas (S302). The steps S300 and S302 may be identical or similar to the above-described steps S270 and S272 of FIG. 3a.

In the step S302, upon recognizing the first and second areas contacting each other due to bending of the flexible display unit 251, the controller 180 detects the user's touch input on any one of the first and second areas (S304). In the step S304, upon detecting the user's touch input on any one of the first and second areas, the controller 180 may recognize that the user's touch input is applied to the area where the user's touch input is not detected, as well as to the area where the user's touch input is detected.

For example, in the step S302, upon recognizing contacting areas, the controller 180 may allow the relative positions of image data portions displayed in the contacting areas, i.e., the first and second areas to be recognized in both of the first and second areas. The controller 180 may allow the position of image data portion displayed in each of the contacting areas on the display unit 251 to be recognized in the other area.

That is, the controller 180 may allow the positions of image data portions displayed in the second area, as well as the positions of image data portions displayed in the first area, to be recognized in the first area. Likewise, the controller 180 may allow the positions of image data portions displayed in the first area, as well as the positions of image data portions displayed in the second area, to be recognized in the second area. Accordingly, when the user's touch input is applied to any one of the first and second areas, the controller 180 may recognize the user's touch input as intended for an image data portion displayed in the area where the user's touch input is not applied.

On the other hand, the controller 180 may recognize the user's touch input as intended for an image data portion displayed in the area where the user's touch input is not applied by detecting the user's touch input at different sensitivity levels for the first and second areas. For example, the controller 180 may use a normal touch detection mode to detect the user's touch input in the area where the touch input is directly applied and use a sensitive touch detection mode to detect the user's touch input in the area where the touch input is not directly applied. The sensitive touch detection mode refers to a mode in which the user's touch input is detected with higher sensitivity. For example, upon detecting the user's touch input based on the current generated from the user's body, the approaching body can be detected with higher sensitivity in the sensitive touch detection mode because the threshold current value for this mode is lower than that for the normal touch detection mode.

The controller 180 may control at least one image data portion displayed in the first and second areas, based on the user's touch input detected in the step S304 (S306). For example, the controller 180 may change the position or color of at least part of the image data portion displayed in one of the first and second areas where the user's touch input is applied, based on the user's touch input. Alternatively, the controller 180 may change the position or color of an image data portion displayed in the area where the user's touch input is not applied, in repose to the user's touch input.

When the user's touch input is detected using different touch detection modes for the first and second areas, the controller 180 may select and control at least one image data portion displayed in the first and second areas and corresponding to the user's touch input, according to the normal touch detection mode and the sensitive touch detection mode.

Alternatively, the controller 180 may recognize the sizes and positions of the contacting areas, i.e., the first and second areas, of the flexible display unit 251 which are recognized in the step 302, and control the image data portions based on the positions of the image data portions displayed in the first and second areas. That is, upon detecting the user's touch input on any one of the first and second areas, the controller 180 may recognize both an image data portion displayed in the user touch detection area and an image data portion displayed in the other area as corresponding to the user's touch input. Also, the controller 180 may control the image data portions corresponding to the user's touch input based on the touch input.

Accordingly, in the flexible glass display apparatus 100 according to the embodiment of the present invention, if the flexible display unit 251 is bent by external force and contacting areas (first and second areas) are formed, image data portions displayed distinguishably in both of the first and second areas may be controlled based on touch input applied to any one of the first and second areas. Accordingly, after the user has deformed the outer shape of the flexible display unit 251 as they wish, the user may freely change the positions or colors of image data portions displayed in at least two areas which are brought into contact with each other depending on the deformed shape of the flexible display unit 251.

As well as an image data portion displayed in any one of the contacting areas of the flexible display unit 251, multiple image data portions may be controlled based on the user's touch input. More specifically, both an image data portion displayed in the area where the user's touch input is applied and an image data portion displayed in the area where the user's touch input is not applied may be controlled based on the user's touch input on the first area.

Figure 4:
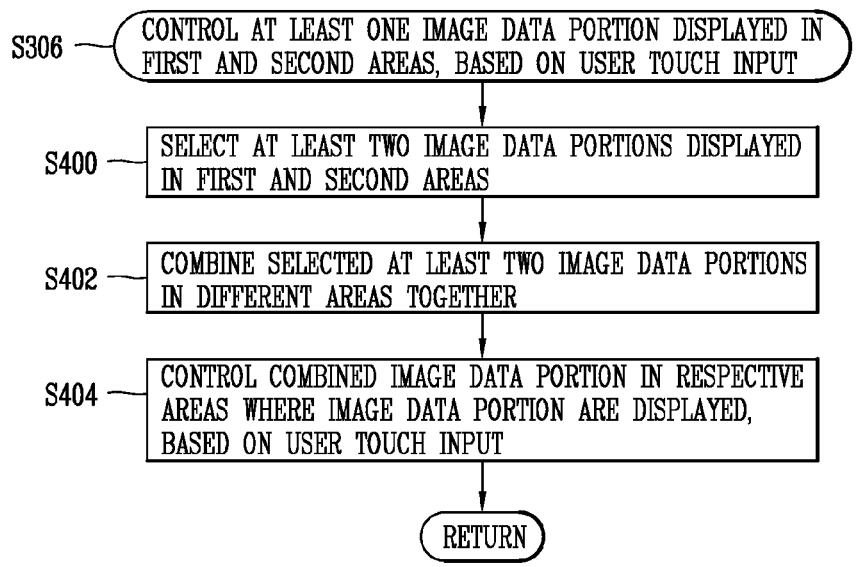
FIG. 4 is a flowchart illustrating an example of controlling image data portions displayed in different areas based on user's touch input, in the procedure of FIG. 3b.

FIG. 4 illustrates an example of the process of controlling image data portions displayed in different areas based on user's touch input.

Referring to FIG. 4, upon detecting user's touch input on any one of the contacting areas, i.e., first and second areas in the step S304, the controller 180 may select at least two image data portions displayed in the first and second areas based on the user's touch input (S400). For example, upon detecting the user's touch input in the first area, the controller 180 may select the image data portion displayed at the point in the first area of the flexible display unit 251 where the touch input is detected. Also, the controller 180 may select the image data portion corresponding to the point in the first area of the flexible display unit 251 and displayed at a point in the second area of the flexible display unit 251.

The controller 180 may recognize the position of the touch detection point within the first area. Also, the controller 180 may calculate the position of a specific point within the second area which corresponds to the recognized position of the touch detection point in the first area. For example, if the flexible display unit 251 is bent to more than a predetermined angle, the controller 180 may recognize a certain straight line with respect to which the flexible display unit 251 is bent. The controller 180 calculates the position of the touch detection point in the first area with respect to the recognized straight line and the position of a specific point corresponding to the calculated position, i.e., being on the opposite side to the touch detection point and at the same distance away from the straight line. Also, the controller 180 may recognize the image data portion displayed at the calculated specific point in the second area as corresponding to the user's touch input applied on the first area.

When different touch detection modes are used in the contacting areas, upon application of the user's touch input on the first area, for example, the controller 180 may detect the touch input using the normal detection mode in the first area and select the image data portion corresponding to the detected touch input position in the first area and, at the same time, detect the touch input using the sensitive touch detection mode in the second area and select the image data portion corresponding to the detected touch input position in the second area.

In the step S400, when at least two image data portions displayed in the first and second areas are selected, the controller 180 may combine together the selected at least two image data portions displayed in the different areas (S402). Combining multiple image data portions together may refer to controlling them together based on the user's touch input, or refer to actually combining at least part of the image data portions together into a single image.

As described above, the present invention may be implemented as a glass display. Accordingly, if the relative positions of image data portions displayed in the first and second areas at least partially overlap, when the flexible display unit 251 is bent by external force, the image data portion in the second area may be reflected through at least part of the image data portion in the first area. As such, if the relative positions of image data portions in the contacting areas at least partially overlap in the display area, the controller 180 may determine that the image data portions are combined together, and control the combined image data portions as the user chooses (S404).

For example, the controller 180 may change the positions of the combined image data portions based on the user's touch input detected in at least one of the first and second areas. That is, when the areas (first and second areas) are in contact with each other, the positions of the combined image data portions may be shifted based on the user's touch input. When these areas are separated from each other due to a change in the external force applied to the flexible display 251, the controller 180 may apply these changes in the positions of the combined image data portions to display the shifted positions of the combined image data portions in the first and second areas. In this way, the present invention provides a user environment which offers the characteristics of a glass display as well as the characteristics of a flexible display.

Needless to say, the controller 180 may control the combined image data portions in whole or in part based on the user's touch input. For example, the controller 180 may control at least part of the image data portion in the other area reflected in at least part of the display area where any one of the combined image data portions is displayed, as the user chooses. That is, it is needless to say that the controller 180 may change the positions of at least part of the image data portion displayed in any one of the areas and at least part of the image data portion in the other area which is reflected in the any one of the areas, or change the colors of at least part of the image data portions.

Figure 5:
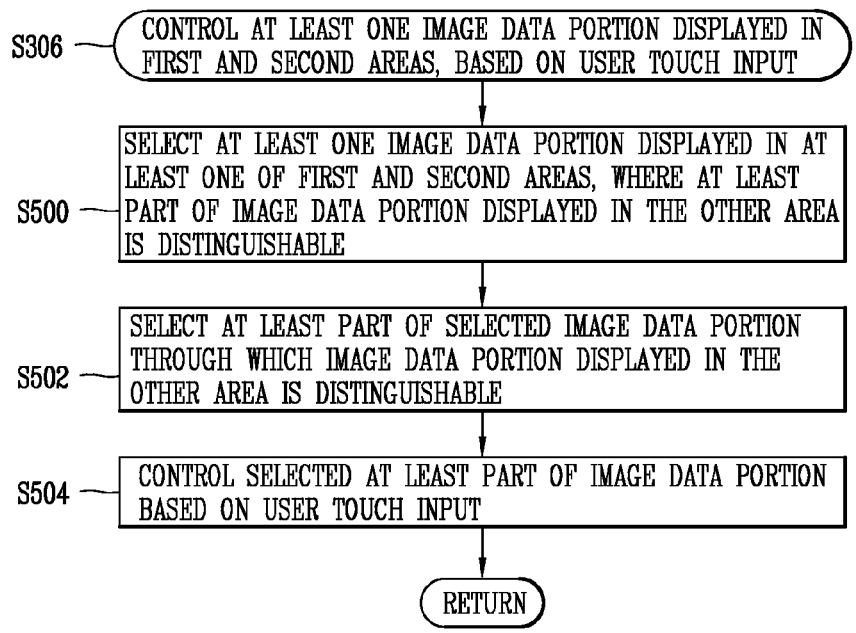
FIG. 5 is a flowchart illustrating another example of controlling image data portions displayed in different areas based on user's touch input, in the procedure of FIG. 3b.

FIG. 5 is a flowchart illustrating the operational procedure of a flexible glass display according to an embodiment of the present invention, in which at least some image data portions displayed in different areas are controlled based on user's touch input.

Referring to FIG. 5, the controller 180 of the flexible glass display apparatus 100 according to the embodiment of the present invention may select at least one image data portion which is displayed in the area where user's touch input is not directly applied and distinguishably reflected through at least part of an image data portion displayed in the user touch detection area, among the contacting areas (first and second areas) (S500).

For example, the controller 180 may recognize the positions of the image data portions displayed in the contacting areas with respect to a certain straight line with respect to which the flexible display unit 251 is bent. Based on the recognized positions of the image data portions, the controller 180 may allow the position of the image data portion in each of the first and second areas to be recognized in the other area. If the recognized positions correspond to each other, i.e., the position of the image data portion displayed in the first area and the position of the image data portion displayed in the second area at least partially overlap each other, the controller 180 may recognize the image data portion in each of the first and second areas as distinguishably reflected through the image data portion in the other area. Also, the controller 180 may select at least one of the recognized image data portions which corresponds to the user's touch input.

Alternatively, the controller 180 may use different touch detection modes to check for the presence of both an image data portion detected in the area where the user's touch input is directly applied according to the normal touch detection mode and an image data portion detected in the area where the touch input is not directly applied according to the sensitive touch detection mode. If there exist both of the image data portion detected according to the normal touch detection mode and the image data portion detected according to the sensitive touch detection mode, the controller 180 may recognize the image data portion in each of the areas as at least partially distinguishably reflected in the other area. Also, the controller 180 may select at least one of the recognized image data portions which corresponds to the user's touch input.

The controller 180 may select at least part of the selected image data portion through which the image data portion displayed in the area where the touch input is not directly applied is reflected (S502). Then, the controller 180 may control the selected at least part of the image data portion as the user chooses (S504). For example, the controller 180 may change the color or position of the selected at least part of the image data portion based on the user's touch input. Alternatively, the controller 180 may duplicate the selected at least part of the image data portion and shift the duplicated part of the image data portion in at least one of the first and second areas based on the user's input.

Needless to say, the controller 180 may shift the at least part of the image data portion in the area where the touch input is directly applied, as well as in the area where the touch input is not directly applied. For example, upon detecting user's touch input at a point where an image data portion is displayed in the first area, the controller 180 may control at least part of the image data portion corresponding to the touch input and at least part of the image data portion in the second area, which is distinguishably reflected through the at least part of the image data portion in the first area, based on the touch input. For example, the controller 180 may determine that at least part of the image data portion displayed in a part of the second area corresponding to a part of the first area where the image data portion is displayed is at least part of the image data portion in the second area which is distinguishably reflected.

Also, the controller 180 may change the position or color of at least part of the image data portion in the second area, as well as the position or color of at least part of the image data portion in the first area, based on the user's touch input. When changing the color of at least part of the image data portions, the controller 180 may change the colors of at least part of the image data portions in the first and second areas to a mixture of the colors of the at least part of the image data portions in the first and second areas.

That is, if the color of at least part of the image data portion in the first area where the image data portion in the second area is distinguishably reflected is red and the color of at least part of the image data portion in the second area reflected in a part of the first area is blue, the controller 180 may change the colors of at least part of the image data portions in the first and second areas to purple, a mixture of red and blue. Also, the controller 180 may shift at least part of the image data portions of the changed color or duplicates thereof in the first and second areas based on the user's touch input.

As mentioned above, upon detecting user's touch input, the flexible glass display apparatus 100 according to the embodiment of the present invention may output tactile information set on an image data portion corresponding to the touch input as a response to the touch input. In this case, the flexible glass display apparatus 100 according to the embodiment of the present invention may output tactile information set on the image data portion displayed in the area where the user's touch input is applied and tactile information set on the image data portion displayed in the area where the user's touch input is not directly applied, as a response to the touch input. Besides, upon detecting the touch input in part of the first and second areas where the image data portions displayed in the contacting areas overlap each other, the controller 180 may output a combination of the tactile information set on the image data portions in both of the areas as a response to the touch input.

Figure 6:
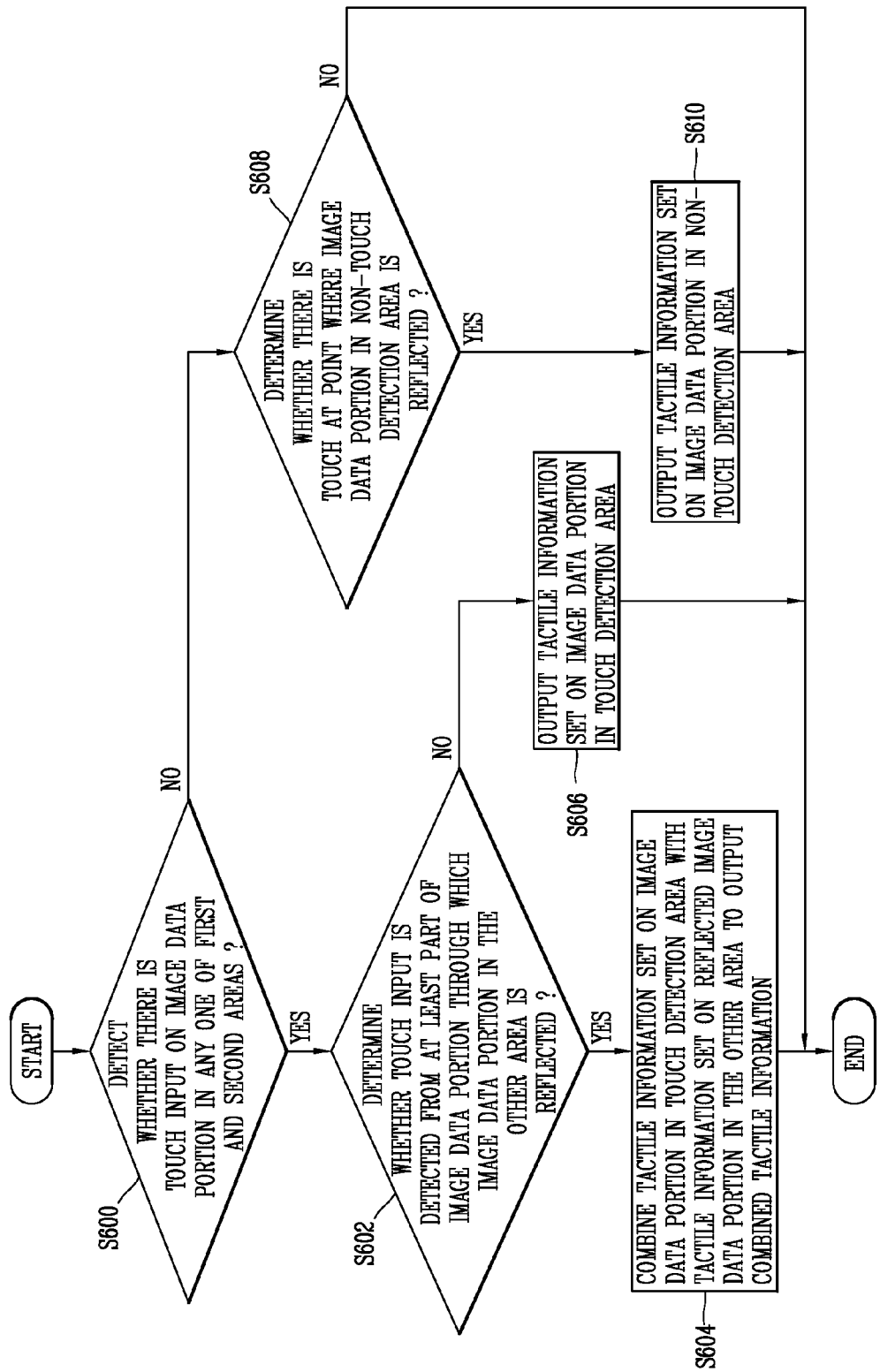
FIG. 6 is a flowchart illustrating the process of outputting tactile information as a response to user's touch input in the flexible glass display apparatus related to the present invention.

FIG. 6 illustrates an example of the operational procedure of outputting tactile information as a response to user's touch input in the flexible glass display apparatus 100 according to the embodiment of the present invention.

Referring to FIG. 6, the controller 180 detects whether user's touch input is applied in a part of the display unit where any one of image data portions in any of the first and second areas contacting each other is displayed (S600). In the following description, for convenience of explanation, the area where the user's touch input is directly applied is referred to as the first area, and the area where the user's touch input is not directly applied is referred to as the second area.

Upon detecting the touch input in a part where any one of the image data portions in the first area is displayed in the step S600, the controller 180 may determine whether the touch input is detected in at least part of the image data portion in the first area where an image data portion in the second area is reflected (S602).

For example, as described above in the step S304, the controller 180 may allow the position of the image data portion displayed in the area (second area) where the user's touch input is not directly applied, to be recognized in the area (first area) where the user's touch input is directly applied as well. Based on this, the controller 180 may recognize the image data portions in the first and second areas which correspond to the position where the user's touch input is applied.

Hereupon, the controller 180 may detect the image data portion in the first area where part of the image data portion in the second area is reflected, based on the display position and size of the image data portions in the first and second areas. Also, the controller 180 may recognize at least part of the detected image data portion in the first area where part of the image data portion in the second area is reflected. In this case, the step S602 may be the step of determining whether the controller 180 has detected the user's touch input from the recognized at least part of the image data portion.

Alternatively, the controller 180 may use different touch detection modes to check for the presence of image data portions in both of the first and second areas that correspond to a touch input position detected according to the normal touch detection mode and a touch input position detected according to the sensitive touch detection mode. If image data portions corresponding to the touch input exist in both of the first and second areas, the controller 180 may recognize at least part of the image data portions as distinguishable in each of the first and second areas. In this case, the step S602 may be the step of determining whether user's touch input is detected in at least part of the distinguishable image data portions.

If the determination result of the step S602 shows that the touch input is detected in at least part of the image data portion in the first area where the image data portion in the second area is reflected, the controller 180 may combine tactile information set on the image data portion in the first area with tactile information set on the reflected image data portion in the second area to output combined tactile information (S604).

On the other hand, if the touch input is not detected in the part where the image data portion in the second area is reflected in the step S604, the controller 180 may output the tactile information set on the image data portion corresponding to the touch input in the first area as a response to the touch input (S606).

If the user's touch input is not applied to any image data portion displayed in the first area in the step S600, the controller 180 determines whether the touch input is detected at a point in the first area where the image data portion in the second area is reflected (S608). If the determination result of the step S608 shows that the user's touch input is detected at a point where the image data portion in the second area is reflected, the controller 180 may output the tactile information set on the image data portion in the second area as a response to the user's touch input (S610).

For example, as described above, the controller 180 may detect the position in the first area where the image data portion in the second area is reflected, based on the display position and size of the image data portions detected in the first and second areas. Upon detecting the touch input at a point corresponding to the position in the first area where the image data portion in the second area is reflected, the controller 180 may output the tactile information set on the image data portion in the second area.

Alternatively, as described above, upon detecting image data portions corresponding to the user's touch input in the first and second areas by using different touch detection modes, if no image data portion in the first area corresponds to a touch input position detected according to the normal touch detection mode, the controller 180 may detect a position in the second area where the touch input is detected according to the sensitive touch detection mode. Also, the controller 180 may output the tactile information set on the image data portion in the second area displayed in the detected position as a response to the touch input.

In this way, in the present invention, if the user touches part of the image data portion in the second area which is reflected in the first area, the tactile information set on the image data portion in the second area may be output as a response to the user's touch input. Accordingly, even when the user touches any one of the first and second areas, the tactile information set on the image data portion displayed in the area where the touch input is directly applied and the tactile information set on the image data portion displayed in the area where the touch input is not directly applied may be output as a response to the touch input. Also, if the image data portion displayed in the second area is reflected through at least part of the image data portion in the first area, upon detecting the user's touch input on the at least part of the image data portion in the first area, the tactile information set on the image data portion in the first area and the tactile information set on the image data portion in the second area may be output to make the user have a different tactile feel.

Therefore, if an area (first area) on the flexible display unit 251 where a hat-shaped image data portion is displayed and an area (second area) on the flexible display unit 251 where a person-shaped image data portion is displayed are brought into contact with each other by external force applied to the flexible display unit 251, the controller 180 may output tactile information set on the hat-shaped image data portion or the person-shaped image data portion, based on the point at which the user's touch input is detected.

That is, when the user touches the hat-shaped image data portion in the first area, the controller 180 may output tactile information corresponding to the texture of the hat to make the user have the feel of the texture of the hat. Also, when the user touches the person-shaped image data portion, especially, the hat displaying part, in the second area, the controller 180 may make the user to feel as if they are touching the person's hair. Also, when the user touches a point in the first area in which the person's head portion is reflected through part of the hat-shaped image data portion, the controller 180 may combine the tactile information set on the hat-shaped image data portion with the tactile information set on the person-shaped image data portion so that the user can feel as if they are touching the head of the person wearing the hat.

The foregoing description has been made in detail with reference to the drawings about the operational procedure of controlling at least one image data portion displayed in areas which are brought into contact with each other as the flexible display unit 251, implemented as a glass display in the flexible glass display apparatus 100 according to the embodiment of the present invention, is deformed by external force.

The following description will be given in detail with reference to the drawings about an example of controlling image data portions by the above operational procedure of the flexible glass display apparatus 100 according to the embodiment of the present invention.

As mentioned above, in the present invention, if some areas are brought into contact with each other by external force, both an image data portion in one of the areas where user's touch input is applied and an image data portion in the other area where the touch input is not applied may be controlled based on the user's touch input.

Figure 7:
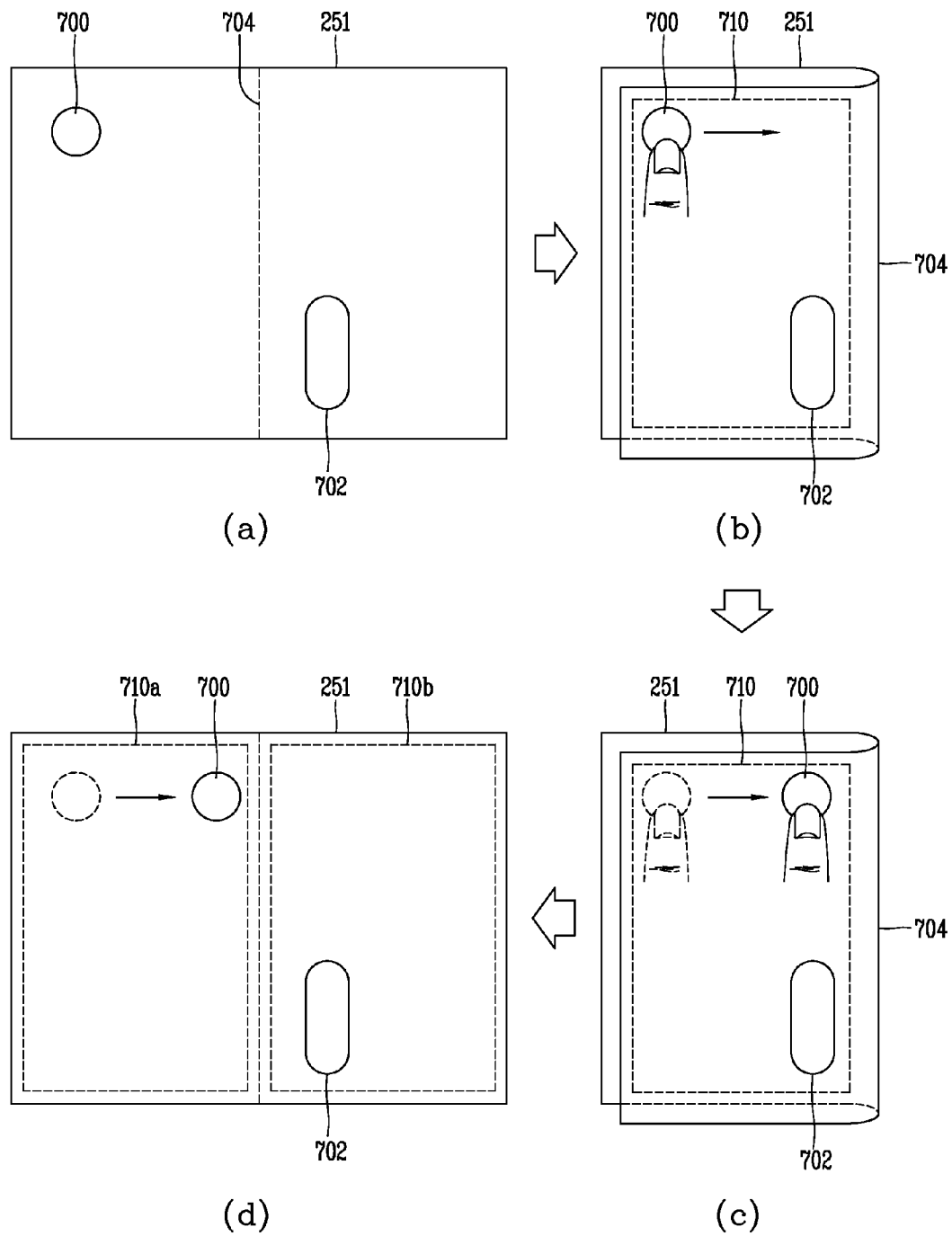
FIG. 7 is a view illustrating an example of controlling any one image data portion based on user's touch input in the flexible glass display apparatus related to the present invention.

FIG. 7 illustrates an example of controlling any one image data portion based on user's touch input in the flexible glass display apparatus related to the present invention.

Referring first to (a) of FIG. 7, (a) of FIG. 7 illustrates an example of displaying image data portions 700 and 702 on the flexible glass display apparatus 100 according to the embodiment of the present invention. In this example, the flexible glass display apparatus 100 according to the embodiment of the present invention may be deformed by external force, and (b) of FIG. 7 illustrates an example where the flexible display unit 251 is bent with respect to a certain straight line 704.

Referring to (b) of FIG. 7, if the flexible display unit 251 is bent with respect to the straight line 704, contacting areas 710 may be formed on the bent flexible display unit 251. Due to the characteristics of the present invention implemented as a glass display, as shown in (b) of FIG. 7, both of the image data portions 700 and 702 may be visible in the contacting areas 710. In this case, the second image data portion 700 may be reflected and identifiably visible in the area (first area) where the first image data portion 702 is displayed.

Hereupon, the user may touch a position in the area (first area) displaying the first image data portion 702 where the second image data portion 700 is reflected, and the controller 180 may recognize the touch input applied to the first area as intended for the second image data portion 700.

For example, if contacting areas are formed described above, the controller 180 may allow the positions and sizes of the image data portions displayed in the first and second areas to be recognized in both of the first and second areas. That is, if contacting areas are formed, the controller 180 may allow the size and position of the image data portion displayed in the first area to be recognized in the second area and the size and position of the image data portion displayed in the second area to be recognized in the first area. Accordingly, when the user touches the first area where only the first image data portion 702 is displayed as shown in (b) of FIG. 7, the touch input may be recognized as intended for the second image data portion 700.

Similarly, if contacting areas are formed, the controller 180 may use different touch detection modes in the area where the user's touch input is directly applied and the other area. That is, upon detecting user's touch input in any one of the contacting areas, the controller 180 may determine that the area where the touch input is detected more distinctly is the area where the user's touch input is directly applied. In this case, the controller 180 may use the normal touch detection mode in the area where the touch input is directly applied and the sensitive touch detection mode in the other area. For example, the controller 180 may determine that an area where the user's touch input has a predetermined or higher sensitivity level is the area where the touch input is detected more distinctly.

Moreover, the controller 180 may detect points corresponding to the touch input in the respective areas based on the normal touch detection mode and the sensitive touch detection mode. In addition, the controller 180 may recognize image data portions corresponding to the detected points as corresponding to the user's touch input. Accordingly, as shown in (b) of FIG. 7, if no image data portion corresponds to a detected touch input point according to the normal detection mode, the controller 180 may recognize an image data portion corresponding to the detected touch input point, i.e., the second image data portion 700, as corresponding to the touch input according to the sensitive touch detection mode.

If the image data portion (second image data portion 700) displayed in the second area corresponds to the user's touch input applied to the first area, the controller 180 controls the image data portion (second image data portion 700) based on the touch input. For example, the controller 180 may shift the second image data portion 700 based on the touch input, as shown in (c) of FIG. 7.

If the second image data portion 700 is shifted as shown in (c) of FIG. 7, the second image data portion 700 may be kept in the shifted position even when the shape of the flexible display unit 251 is recovered as shown in (d) of FIG. 7.

Accordingly, in the present invention, if contacting areas are formed because the flexible display unit 251 is bent to more than a predetermined angle, even the image data portion displayed in the area where the user's touch input is not directly applied may be changed in position as the user chooses.

It should be noted that, like one image data portion is shifted as shown in FIG. 7, at least two image data portions may be shifted together based on the user's touch input.

Figure 8:
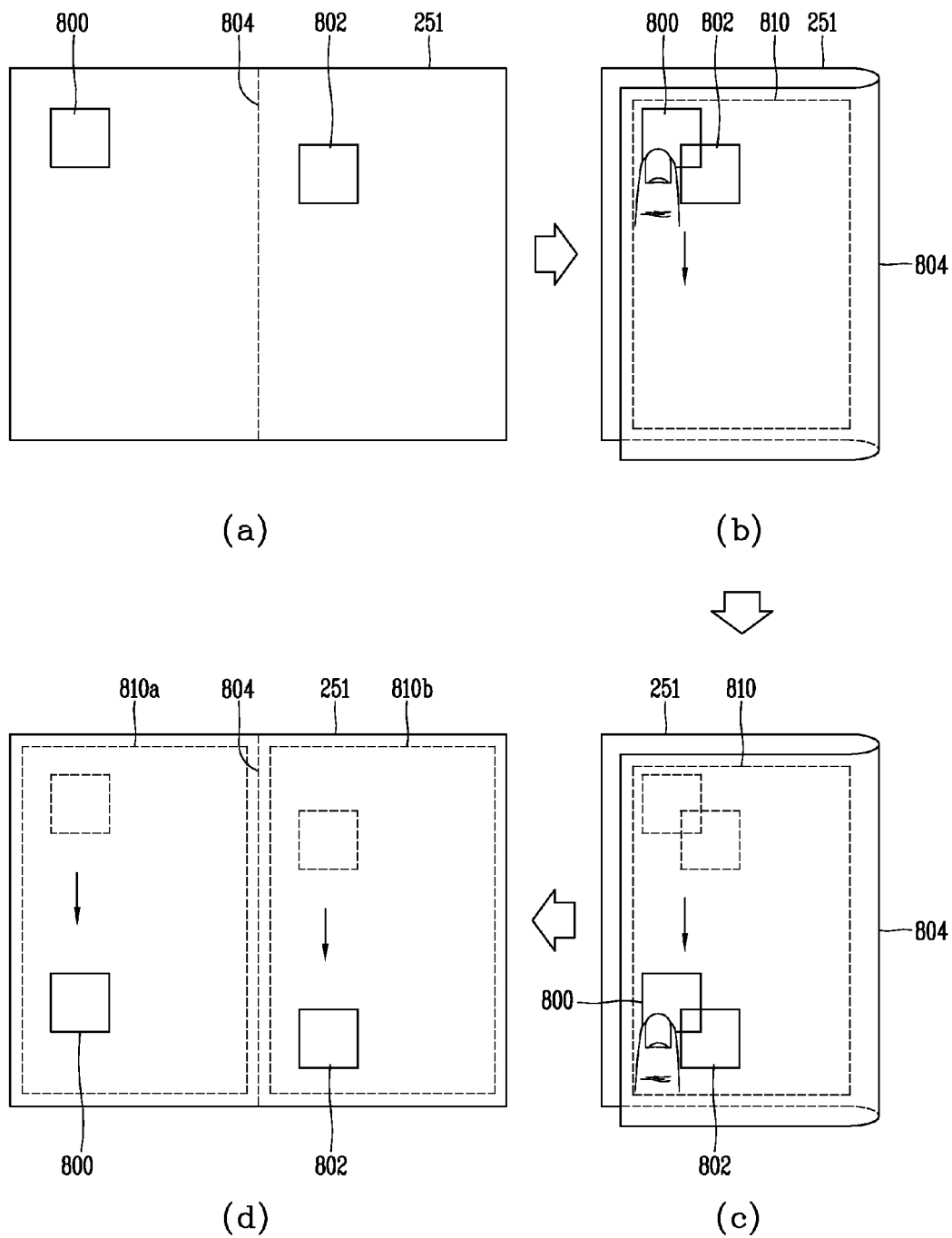
FIG. 8 is a view illustrating an example of controlling multiple image data portions based on user's touch input in the flexile glass display apparatus related to the present invention.

FIG. 8 illustrates an example of controlling multiple image data portions based on user's touch input in the flexile glass display apparatus related to the present invention.

For example, when image data portions 800 and 802 are displayed as shown in (a) of FIG. 8, if the flexible display unit 251 is bent to more than a predetermined angle with respect to a certain straight line 804, contacting areas 810 may be formed in the area on the display unit 251 where the first image data portion 802 is displayed and in the area on the display unit 251 where the second image data portion 800 is displayed.

In this case, due to the characteristics of the present invention implemented as a glass display, as shown in (b) of FIG. 8, the second image data portion 800 may be reflected in the area on the display unit 251 where the first image data portion 802 is displayed. Also, at least part of the reflected second image data portion 800 may correspond to the area where the first image data portion 802 is displayed. Accordingly, as shown in (b) of FIG. 8, at least two image data portions displayed in the contacting areas 810a and 810b may appear at least partially overlapping each other.

In this case, as shown in (b) of FIG. 8, the controller 180 may control the first image data portion 802 and the second image data portion 800, based on the user's touch input detected in the area 810b where the first image data portion 802 is displayed. For example, if at least part of the reflected second image data portion 800 corresponds to the area where the first image data portion 802 is displayed, the controller 180 may combine the first image data portion 802 and the second image data portion 800 together.

Upon detecting the user's touch input either on the part displaying the first image data portion 802 or on the part reflecting the second image data portion 800, in the area 810b where the first image data portion 802 is displayed, the controller 180 may shift the combined image data portions 800 and 802 based on the user's touch input, as shown in (c) of FIG. 8.

Accordingly, the image data portions 800 and 802 may be shifted and kept in the shifted positions even when the external force applied to the flexible display unit is released and hence the flexible display unit 251 recovers its original shape. Therefore, as shown in (d) of FIG. 8, the first image data portion 802 and the second image data portion 800 may be kept in the positions shifted as shown in (c) of FIG. 8.

As described above, it is needless to say that the positions or colors of at least part of an image data portion displayed in one area and at least part of an image data portion displayed in another area and reflected through the at least part of the image data portion displayed in the one area may be changed. An example of this case will be described in detail with reference to FIGS. 9 and 10.

Figure 9:
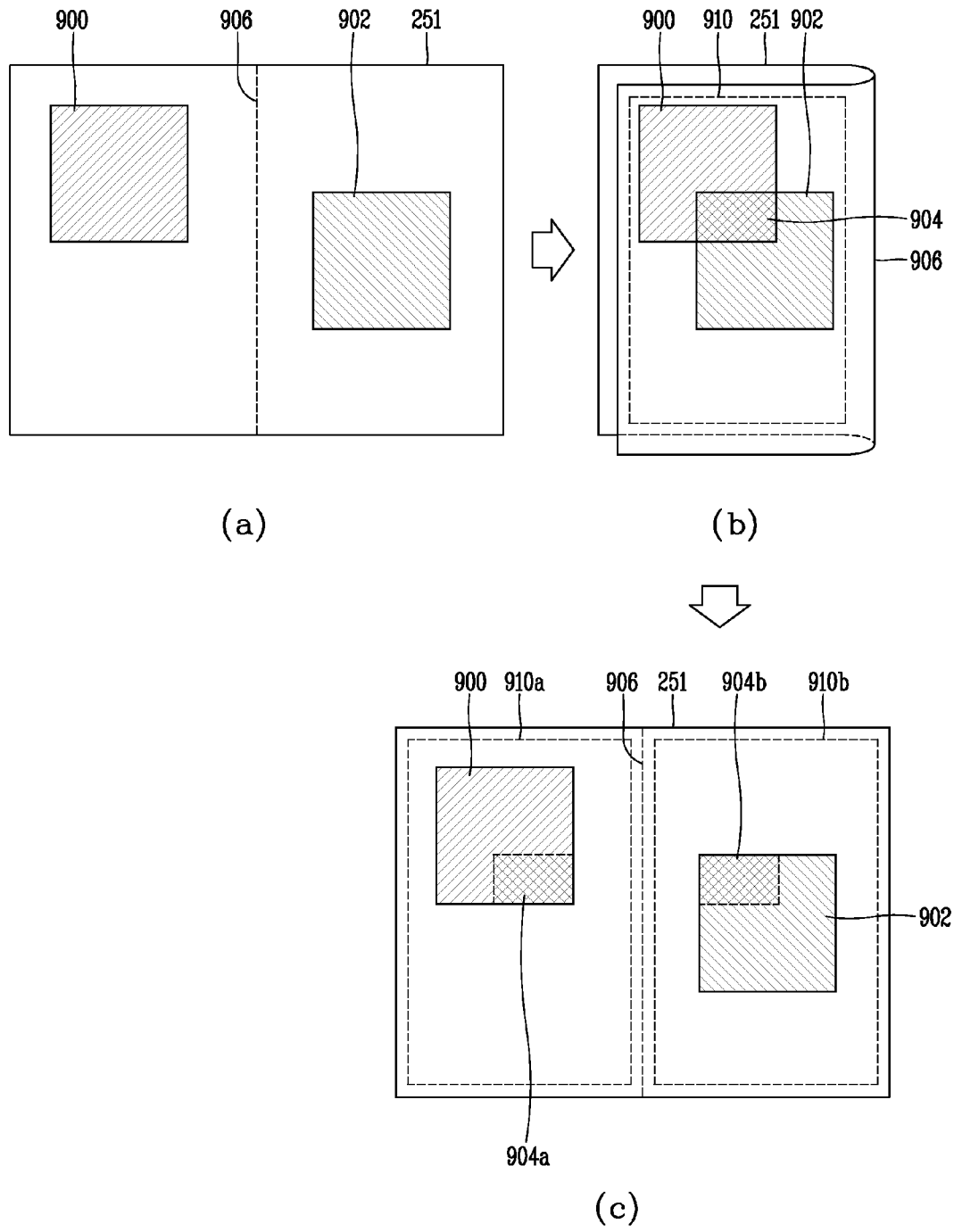
FIG. 9 is a view illustrating an example of changing the color of at least part of an image data portion displayed on the display unit depending on a deformed state of the flexible glass display apparatus related to the present invention.

First of all, FIG. 9 illustrates an example of changing the color of at least part of an image data portion displayed on the display unit depending on a deformed state of the flexible glass display apparatus related to the present invention.

(a) of FIG. 9 shows an example of displaying image data portions 900 and 902 of different colors on the flexible glass display apparatus according to the embodiment of the present invention. If the flexible display unit 251 is bent to more than a predetermined angle with respect to a certain straight line 906, contacting areas 910 may be formed on the bent flexible display unit 251.

(b) of FIG. 9 shows an example of this case. Referring to (b) of FIG. 9. Due to the characteristics of the present invention implemented as a glass display, a first image data portion 902 and a second image data portion 900 may be reflected and distinguishably visible in the contacting areas 910. As shown in (b) of FIG. 9, the second image data portion 900 may be reflected through at least part of the first image data portion 902.

Hereupon, part of the first image data portion 902 through which part of the second image data portion 900 is reflected may appear in a mixture of the color of the second image data portion 900 and the color of the first image data portion 902. Since the present invention may be implemented as a flexible display as described above, even the shape and color of the first image data portion 902 is reflected and identifiable even when the display unit 251 is bent, as shown in (b) of FIG. 9.

If contacting areas 910 are formed as shown in (b) of FIG. 9, the controller 180 may detect this and automatically change the colors of at least part of the first image data portion 902 and at least part of the second image data portion 900. That is, as shown in (b) of FIG. 9, if the second image data portion 900 is reflected through at least part of the first image data portion 902, the controller 180 may automatically change the color of part of the first image data portion 902 through which the second image data portion 900 is reflected, that is, the color of an overlap region 904 between the first image data portion 902 and the second image data portion 900, as shown in (b) of FIG. 9.

In contrast, upon detecting the user's touch input in that region 904, the controller 180 may change the colors of a part 904a of the second image data portion 902 and a part 904b of the first image data portion 904, both corresponding to the region 904, to a mixture of the colors of the first and second image data portions 902 and 900. Once the colors of the part 904b of the first image data portion 902 and the part 904a of the second image data portion 900 are changed, their colors will stay the same even after the external force is released and hence the flexible display unit 251 recovers its original shape. (c) of FIG. 9 shows an example of this case.

Needless to say, at least part of an image data portion through which an image data portion displayed in a different area is reflected may be shifted as the user chooses, as well as changing the color of the at least part of the image data portion as shown in FIG. 9.

FIG. 10 illustrates an example of controlling, based on user's touch input, at least part of image data portions selected depending on a deformed state of the flexible glass display apparatus related to the present invention.

First of all, when a first image data portion 1002 and a second image data portion 1000 are displayed as shown in (a) of FIG. 10, if the flexible display unit 251 is bent to more than a predetermined angle with respect to a certain straight line 1006, the second image data portion 1000 may be reflected through at least part of the first image data portion 1002. Also, as shown in (b) of FIG. 10, a region 1004 where the first image data portion 1002 and the second image data portion 1000 appear overlapping each other may appear in a mixture of the color of the first image data portion 1002 and the color of the second image data portion 1000.

Hereupon, if the user's touch input is applied to the region 1004, as shown in (b) of FIG. 10, the controller 180 may create an image data portion corresponding to the region 1004 based on the user's touch input. More specifically, upon detecting the user's touch input on the region 1004, the controller 180 may create a new image data portion 1008 of the size and color corresponding to the region 1004 and shift the created image data portion 1008 based on the touch input.

Accordingly, as shown in (c) of FIG. 10, the controller 180 may allow the image data portion 1008 of the size and color corresponding to the region 104, where the first image data portion 1002 and the second image data portion 1000 appear overlapping each other, to be displayed at a position different than the position of the region 1004, based on the user's touch input. In this case, the image data portion 1008 may be created in each of the contacting areas 1010a and 1010b. (d) of FIG. 10 shows an example of this case where image data portions 1008a and 1008b corresponding to the image data portion 1008 may be displayed in the contacting areas 1010a and 1010b, respectively, even after the flexible display unit 251 recovers its original shape.

FIGS. 11a and 11b are views for explaining an example of outputting different tactile information depending on a deformed state of the flexible glass display device related to the present invention.

Referring first to FIG. 11a, (a) of FIG. 11a shows a first image data portion 1102 and a second image data portion 1100 being displayed on the flexible display unit 251. Hereupon, if the flexible display unit 251 is bent at more than a predetermined angle with respect to a certain straight line 1106, the flexible glass display apparatus 100 according to the embodiment of the present invention may be deformed as shown in (b) of FIG. 11a. Due to the characteristics of the present invention implemented as a glass display, as shown in (b) of FIG. 11, both of the first and image data portions 1102 and 1100 may be distinguishably visible on the bent flexible display unit 251.

Hereupon, if the user touches the part displaying the first image data portion 1102 in the area of the display unit 251 where the first image portion 1102 is displayed, the controller 180 may output tactile information set on the first image data portion 1102. Accordingly, the user may feel the texture of the hair or the hardness of the person's head with the body part touching it, for example, a finger.

On the other hand, if the user touches the part reflecting the second image data portion 1100 in the area of the display unit 251 where the first image portion 1102 is displayed, the controller 180 may output tactile information set on the second image data portion 1100. For example, the controller 180 may recognize the sizes and positions of image data portions displayed in areas which are brought into contact 1110 with each other due to bending of the flexible display unit 251. Based on the recognized sizes and positions of the image data portions, the controller 180 may determine whether the user's touch input on the area of the display unit 251 where the first image data portion 1102 is displayed is intended for the second image data portion 1100 or not. Alternatively, the controller 180 may use different touch detection modes for the contacting areas 1110 to determine whether the user's touch input is intended for the second image data portion 1100 or not.

Accordingly, the controller 180 may output tactile information set on the second image data portion 1100 as a response to the touch input. Therefore, even if the user has not touched the area of the display unit 251 where the second image data portion 1100 is displayed, they may feel the tactile information set on the second image data portion 1100 with the body part touching it, i.e., a finger.

Needless to say, the flexible glass display apparatus 100 according to the embodiment of the present invention may be bent into a different shape from the shape of FIG. 11a, with respect to a certain straight line.

For example, if the flexible display unit 251 is bent with respect to a certain straight line 1108 shown in (a) of FIG. 11b, it may be deformed into the shape shown in (b) of FIG. 11b. Likewise, the controller 180 may output the tactile information set on the first image data portion 1102 or the second image data portion 1100 as a response to the user's touch input.

Besides, as shown in (b) of FIG. 11b, if the user touches the part reflecting the second image data portion 1100 in the area of the display unit where the first image data portion 1102 is displayed, the controller 180 may output a combination of the tactile information set on the first image data portion 1102 and the tactile information set on the second image data portion 1100 as a response to the touch input.

Accordingly, as shown in (b) of FIG. 11b, if the first image data portion 1102 is a person-shaped image data portion and the second image data portion 1100 is a hat-shaped image data portion, the controller 180 may output a combination of tactile information corresponding to the texture of the hat and tactile information corresponding to the shape of the person's head as a response to the user's touch input detected in the part 1130 of the first image data portion 1102 where the second image data portion 1100 is reflected. Therefore, the controller may make the user to feel the texture of the fabric from which the hat is made and at the same time the hardness of the person's head.

The present invention can be embodied as a computer readable code on a computer readable medium. The computer readable medium includes all types of recording medium storing data readable by computer system. For example, the computer readable medium includes HDDs (hard disk drives), SSDs (solid state disks), ROMs, RAMs, CD-ROMs, magnetic tapes, floppy disks, optical data storage media, and carrier waves (e.g., transmissions over the Internet). Also, the computer may include the controller 180 of a terminal.

The foregoing description of the present invention has been given only on an example where the flexible display unit is bent with respect to a certain straight line, this example is merely an embodiment of the present invention and the present invention is not limited to this example. For example, due to the characteristics of the flexible display unit 251 which is bendable, twistable, and squeezable in nature, the flexible display unit 251 may be deformed into various ways such as being bent, twisted, squeezed, etc with respect to multiple straight or curved lines. In this case, not only two, like in the above description, but more than two contacting areas may be formed. In an example, if the flexible display unit 251 is bent at more than predetermined angles with respect to certain two straight parallel lines, at least three contacting areas may be formed. As explained above, it is needless to say that even image data portions displayed in an area where user's touch input is not applied may be controlled as the user chooses, like changing the positions or colors of the image data portions based on the user's touch input.

Although, in the above-described embodiment, the position of an image data portion or the color of at least part of the image data portion is changed as an example of controlling an image data portion as the user chooses, the present invention is not limited to this example. For example, the shape of at least one of image data portions displayed in areas where the user's touch input is not applied may be changed, like rotating on a plane or being partially enlarged or reduced, as the user chooses.

The advantages of a flexible glass display apparatus and a method for controlling the same will be described as follows.

According to at least one of the embodiments of the present invention, the present invention allows the user to control an image data portion displayed in one area of the display unit and an image data portion in another area of the display unit which is reflected in the one area as the user chooses, and hence the user can combine or alter image data portions in each area of the display unit more easily and quickly and therefore can find it quite entertaining and fun in a visual way.

Furthermore, the present invention allows for outputting tactile information set on image data portions displayed in both a touch detection area and an area other than the touch detection area, and therefore the user can combine the tactile information set on multiple image data portions as they wishes and therefore find it quite entertaining and fun in a tactile way.

What is claimed is:

1. A flexible glass display apparatus comprising:
    a flexible glass display configured to detect image data portions;
    a first sensor configured to detect a bending of the display;
    a second sensor configured to detect a first area and a second area of the display which are brought into contact with each other due to the bending of the display; and
    a controller configured to control at least one image data portion displayed in the first and second areas upon detecting of the contact between the first and second areas,
    wherein the controller is further configured to operate two different touch detection modes for the first and second areas of the display respectively such that the first area where a touch input is directly applied is operated at a normal touch sensitive mode and the second area where the touch input is indirectly applied via the first area is operated at a high touch sensitive mode.

2. The flexible glass display apparatus of claim 1, wherein the controller changes a color of at least part of image data portions displayed in each of the first and second areas.

3. The flexible glass display apparatus of claim 1, wherein the first sensor further detects the user's touch input on the first and second areas, and the controller controls image data portions displayed in the second area based on the touch input detected in the first area.

4. The flexible glass display apparatus of claim 3, wherein the controller allows positions and sizes of image data portions displayed in the second area to be recognized in both of the first and second areas to control at least one of the image data portions displayed in the second area based on the touch input on the first area.

5. The flexible glass display apparatus of claim 3, further comprising a tactile module for outputting preset tactile information,
    wherein, upon detecting touch input on any one of the image data portions displayed in the first and second areas, the controller controls the tactile module to output the tactile information set on an image data portion on which the touch input is detected.

6. The flexible glass display apparatus of claim 5, wherein, upon detecting, in the first area, the touch input on any one of the image data portions in the second area which is distinguishable in the first area, the controller controls the tactile module to output tactile information preset on the image data portion in the second area.

7. The flexible glass display apparatus of claim 6, wherein the controller allows the positions and sizes of image data portions displayed in the second area to be recognized in both of the first and second areas, and determine whether the touch input is intended for any one of the image data portions displayed in the second area, based on the recognition result.

8. The flexible glass display apparatus of claim 5, wherein, upon detecting that user's touch input on an image data portion in the first area, through which at least part of an image data portion in the second area is distinguishable, is intended for the distinguishable part of the image data portion in the second area, the controller controls the tactile module to combine tactile information corresponding to the image data portion in the first area with tactile information corresponding to the image data portion in the second area and output the combined tactile information.

9. The flexible glass display apparatus of claim 1, wherein the controller changes a position of at least part of the at least one image data portion displayed in the first and second areas based on the user's touch input.

10. The flexible glass display apparatus of claim 9, wherein the controller changes a color of part of a first image data portion, which corresponds to the touch input and is displayed in the first area and through which at least part of a second image data portion displayed in the second area is distinguishable, to a mixture of the color of the first image data portion and a color of the second image data portion.

11. A method for controlling a flexible glass display apparatus, the method comprising:
    detecting bending of a display;
    detecting first and second areas which are brought into contact with each other due to bending of the display; and
    controlling at least one image data portion displayed in the first and second areas based on the contact,
    wherein two different touch detection modes are being operated for the first and second areas of the display respectively such that the first area where a touch input is directly applied is operated at a normal touch sensitive mode and the second area where the touch input is indirectly applied via the first area is operated at a high touch sensitive mode.

12. The method of claim 11, wherein the controlling image data portions further comprises:
    combining together at least two image data portions displayed in the first and second areas; and
    changing a color of at least part of the combined image data portions to a mixture of the colors of the combined image data portions.

13. The method of claim 11, wherein the detecting first and second areas further comprises detecting the user's touch input in the first area, and controlling the at least one image data portion comprises controlling an image data portion displayed in the second area based on the touch input detected in the first area.

14. The method of claim 13, wherein the detecting touch input further comprises:
    detecting at least one image data portion displayed in the first and second areas and corresponding to the user's touch input; and
    outputting tactile information set on the detected at least one image data portion as a response to the touch input.

* * * * *